United States Patent
Kim et al.

(10) Patent No.: US 10,258,962 B2
(45) Date of Patent: Apr. 16, 2019

(54) SUPERABSORBENT POLYMER AND METHOD FOR PREPARING THE SAME

(71) Applicant: LG Chem, Ltd., Seoul (KR)

(72) Inventors: Ju Eun Kim, Daejeon (KR); Gi Cheul Kim, Daejeon (KR); Sung Soo Park, Daejeon (KR); Hyeon Choi, Daejeon (KR); Hee Jung Choi, Daejeon (KR); Hyo Sook Joo, Daejeon (KR); Ki Youl Yoon, Daejeon (KR)

(73) Assignee: LG Chem, Ltd. (KR)

( * ) Notice: Subject to any disclaimer, the term of this patent is extended or adjusted under 35 U.S.C. 154(b) by 103 days.

(21) Appl. No.: 15/323,142

(22) PCT Filed: Jul. 30, 2015

(86) PCT No.: PCT/KR2015/008002
§ 371 (c)(1),
(2) Date: Dec. 30, 2016

(87) PCT Pub. No.: WO2016/021875
PCT Pub. Date: Feb. 11, 2016

(65) Prior Publication Data
US 2017/0361305 A1    Dec. 21, 2017

(30) Foreign Application Priority Data

Aug. 4, 2014  (KR) .................. 10-2014-0099702
Jul. 29, 2015  (KR) .................. 10-2015-0107452

(51) Int. Cl.
  *B01J 20/26*    (2006.01)
  *C08J 3/075*    (2006.01)
  (Continued)

(52) U.S. Cl.
CPC ........... *B01J 20/267* (2013.01); *B01J 20/261* (2013.01); *B01J 20/3021* (2013.01);
(Continued)

(58) Field of Classification Search
CPC ... C08L 83/06; C08K 3/346; C08K 2201/003; C08K 2201/005; C08K 2201/006; C08K 2201/011
See application file for complete search history.

(56) References Cited

U.S. PATENT DOCUMENTS

| 5,797,893 A | 8/1998 | Wada et al. | |
|---|---|---|---|
| 6,610,780 B1 * | 8/2003 | Payzant | ............... A61L 15/18 524/445 |

(Continued)

FOREIGN PATENT DOCUMENTS

| JP | 4314193 B2 | 8/2009 |
|---|---|---|
| JP | 2010142808 A | 7/2010 |

(Continued)

OTHER PUBLICATIONS

International Search Report from PCT/KR2015/008002, dated Sep. 30, 2015.
(Continued)

*Primary Examiner* — Michael A Salvitti
(74) *Attorney, Agent, or Firm* — Lerner, David, Littenberg, Krumholz & Mentlik, LLP

(57) ABSTRACT

The present invention relates to superabsorbent polymer and a method for preparing the same. More specifically, the present invention relates to superabsorbent polymer with improved properties, comprising a dual cross-linking structure derived from alkyleneglycol multifunctional (meth)acrylate and modified nanoclay, and a method for preparing the same. According to the present invention, the modified nanoclay and alkyleneglycol multifunctional (meth)acrylate are used as internal crosslinking agents in the process of preparing superabsorbent polymer, thus contributing to improvement in the cross-linking degree and the properties of superabsorbent polymer.

15 Claims, 1 Drawing Sheet single cross-linking structure dual cross-linking structure

(51) Int. Cl.
  *C08K 3/34* (2006.01)
  *B01J 20/30* (2006.01)
  *C08F 220/06* (2006.01)
  *C08J 3/24* (2006.01)

(52) U.S. Cl.
  CPC ......... *B01J 20/3085* (2013.01); *C08F 220/06* (2013.01); *C08J 3/075* (2013.01); *C08J 3/245* (2013.01); *C08K 3/346* (2013.01); *C08J 2333/02* (2013.01); *C08K 2201/011* (2013.01)

(56) References Cited

U.S. PATENT DOCUMENTS

| | | | |
|---|---|---|---|
| 9,518,134 B2 * | 12/2016 | Lindner | A61L 15/60 |
| 9,574,023 B2 * | 2/2017 | Lindner | A61L 15/60 |
| 2005/0239942 A1 | 10/2005 | Herfert et al. | |
| 2005/0245393 A1 | 11/2005 | Herfert et al. | |
| 2007/0232760 A1 | 10/2007 | Fujimaru et al. | |
| 2009/0163365 A1 * | 6/2009 | Bentlage | C05G 3/0047 504/360 |
| 2010/0100066 A1 | 4/2010 | Azad et al. | |
| 2010/0210746 A1 | 8/2010 | Gustafson et al. | |
| 2010/0324212 A1 | 12/2010 | Stueven et al. | |
| 2012/0035294 A1 * | 2/2012 | Kim | C08F 2/44 522/154 |
| 2012/0157622 A1 * | 6/2012 | Lindner | A61L 15/60 524/790 |
| 2012/0157623 A1 * | 6/2012 | Lindner | A61L 15/60 524/790 |
| 2015/0246153 A1 | 9/2015 | Ota et al. | |
| 2017/0361305 A1 * | 12/2017 | Kim | B01J 20/267 |

FOREIGN PATENT DOCUMENTS

| | | |
|---|---|---|
| JP | 5091159 B2 | 12/2012 |
| JP | 5380541 B2 | 1/2014 |
| JP | 2014500366 A | 1/2014 |
| JP | 2014023766 A | 2/2014 |
| JP | 2014504317 A | 2/2014 |
| KR | 20050036975 A | 4/2005 |
| KR | 20110086057 A | 7/2011 |
| KR | 20130018350 A | 2/2013 |

OTHER PUBLICATIONS

Herrera, et al., "Aqueous Dispersions of Silane-Functionalized Laponite Clay Platelets. A First Step toward the Elaboration of Water-Based Polymer/Clay Nanocomposites." Langmuir, 2004, vol. 20, No. 5, pp. 1564-1571.

Third Party Observation from PCT/KR2015/008002, dated Dec. 2, 2016.

Lee, Wen-Fu, et al., "Preparation of Reactive Mineral Powders Used for Poly(sodium acrylate) Composite Superabsorbents." Journal of Applied Polymer Science, vol. 97, 2005, pp. 855-861.

Kabiri, Kourosh, et al., "Chitosan-modified nanoclay—poly(AMPS) nanocomposite hydrogels with improved gel strength." Polymer International, vol. 58, 2009, pp. 1252-1259.

* cited by examiner

SUPERABSORBENT POLYMER AND
METHOD FOR PREPARING THE SAME

CROSS-REFERENCE TO RELATED
APPLICATIONS

The present application is a national phase entry under 35 U.S.C. § 371 of International Application No. PCT/KR2015/008002 filed on Jul. 30, 2015, which claims priority to Korean Patent Application No. 10-2014-0099702 filed on Aug. 4, 2014 with the Korean Intellectual Property Office and Korean Patent Application No. 10-2015-0107452 filed on Jul. 29, 2015 with the Korean Intellectual Property Office, the disclosures of which are herein incorporated by reference in their entirety.

BACKGROUND OF THE INVENTION (a) Field of the Invention

The present invention relates to superabsorbent polymer and a method for preparing the same. More specifically, the present invention relates to superabsorbent polymer with improved properties, comprising a dual cross-linking structure derived from alkyleneglycol multifunctional (meth) acrylate and modified nanoclay, and a method for preparing the same.

(b) Description of the Related Art

Super absorbent polymer (SAP) is synthetic polymer material that can absorb moisture of 500 to 1000 times of self-weight, began to be commercialized as sanitary items, and currently, it is being widely used as hygienic goods such as a disposable diaper, sanitary hygienic material and the like, water-holding material for soil, water stop material for civil engineering and architecture, sheets for raising seedling, freshness preservatives in the field of food circulation, and formentation material, and the like.

Superabsorbent polymer uses water soluble ethylenically unsaturated monomers, and as the water soluble ethylenically unsaturated monomers, one or more monomers selected from the group consisting of anionic monomers and salts thereof, nonionic hydrophilic group containing monomers, and amino group containing unsaturated monomers and quarternized products thereof may be used. A solution wherein water soluble ethylenically unsaturated monomers are neutralized with an alkali metal salt such as a sodium salt or a basic compound such as caustic soda, which comprises a cross-linking agent and a polymerization initiator and can be polymerized, is referred to as a monomer composition. The monomer composition is thermally polymerized or photopolymerized to prepare hydrogel polymer, which is then, dried, milled and classified to prepare a powder product.

In order to improve centrifuge retention capacity (CRC) and absorption under pressure (AUP) of the superabsorbent polymer, various cross-linking agents may be added to the insider or the outside of the superabsorbent polymer, and in general, an organic cross-linking agent having a functional group capable of reacting with the water soluble substituent of the water soluble ethylenically unsaturated monomers is used.

Recently, these is an attempt to use nanoclay as the cross-linking agent of superabsorbent polymer, however, due to the low reactivity between the surface hydroxyl group of nanoclay and the superabsorbent polymer, cross-linkability is lowered, and in case nanoclay is introduced into a monomer composition for preparing superabsorbent polymer, due to the high ion concentration of alkali metal salts or basic compounds introduced for neutralization, nanoclay particles tend to coagulate with each other. And, the monomer composition has a pH value in the range of 5 to 7, but it is known that, in the above pH range, nanoclay is unstable and thus coagulation is induced.

As such, due to the high ion concentration and pH of a monomer composition, nanoclay has poor dispersibility in the monomer composition, and coagulation of nanoclay occurs to make the monomer composition opaque and increase the viscosity. In case the dispersibility of nanoclay in the monomer composition is poor and coagulation occurs, centrifuge retention capacity and absorption under pressure of superabsorbent polymer may be rather decreased, and in case the monomer composition is opaque, due to low UV transmittance, polymerization degree may be lowered at the time of UV polymerization.

If nanoclay treated with a dispersant is added so as to improve dispersibility, although dispersibility in the monomer composition is provided, it is difficult to use in superabsorbent polymer because surplus dispersant floats. Thus, there is a demand for a novel internal cross-linking agent that can secure dispersibility in a monomer composition for preparing superabsorbent polymer and can be used as a cross-linking agent of superabsorbent polymer.

(Patent Document 1) JP 2014-023766 A
(Patent Document 2) US2012-0157622A1
(Patent Document 3) US2012-0157623A1
(Patent Document 4) KR10-2013-0018350

SUMMARY OF THE INVENTION

In order to solve the problems of the prior art, it is an object of the present invention to provide superabsorbent polymer with improved properties, comprising a dual cross-linking structure derived from alkyleneglycol multifunctional (meth)acrylate and modified nanoclay, and a method for preparing the same.

In order to achieve the object, one aspect of the present invention provides superabsorbent polymer comprising cross-linked polymer of water soluble ethylenically unsaturated monomers having acid groups of which at least a part are neutralized, wherein the crosslinked polymer comprises a crosslink structure derived from modified nanoclay on the basal surface or edge of which (meth)acrylate functional groups are introduced; and alkyleneglycol multifunctional (meth)acrylate.

Another aspect of the present invention provides a method for preparing superabsorbent polymer comprising the steps of preparing a monomer composition comprising water soluble ethylenically unsaturated monomers; a polymerization initiator; modified nanoclay on the basal surface or edge of which (meth)acrylate functional groups are introduced; and alkyleneglycol multifunctional (meth)acrylate; and progressing thermal polymerization or photopolymerization of the monomer composition to form hydrogel polymer.

According to the superabsorbent polymer and the method for preparing the same, the modified nanoclay on the basal surface or edge of which (meth)acrylate functional groups are introduced, and the alkyleneglycol multifunctional (meth)acrylate act as internal cross-linking agents in the process of preparing superabsorbent polymer, to form a dual cross-linking structure and achieve an appropriate cross-linking density, thereby contributing to improvement in various properties of superabsorbent polymer such as centrifuge retention capacity, absorbency under pressure, permeability, and so on. And, simultaneously, the modified nanoclay may also act as filler to increase gel strength of superabsorbent polymer.

And, since the nanoclay modified with (meth)acrylate may, unlike non-modified nanoclay, maintain transparency and dispersibility in the monomer composition, it does not inhibit the polymerization of the monomer composition, and thus, the efficiency of the polymerization process is high, thus contributing to improvement in the properties of superabsorbent polymer.

DETAILED DESCRIPTION OF THE EMBODIMENTS

Figure 1:
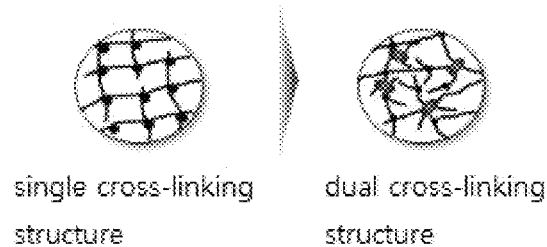
FIG. 1 schematically shows the dual cross-linking structure of the superabsorbent polymer of one embodiment of the present invention, in comparison with the cross-linking structure of the existing superabsorbent polymer.

Technical terms in the present specification are only for mentioning specific embodiments, and they are not intended to restrict the present invention unless there is a particular mention about them. The singular expressions used herein may include the plural expressions unless they are differently expressed contextually. The meaning of the term "comprise", "include" or "has" used in the specification embodies specific characteristics, areas, essences, steps, actions, elements, and/or components, and does not exclude existence or addition of other specific characteristics, areas, essences, steps, actions, elements, components, and/or groups.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, superabsorbent polymer and a method for preparing the same according to specific embodiments of the invention will be explained in more detail.

The superabsorbent polymer according to one aspect of the present invention comprises cross-linked polymer of water soluble ethylenically unsaturated monomers having acid groups of which at least a part are neutralized, wherein the cross-linked polymer comprises a cross-link structure derived from modified nanoclay on the basal surface or edge of which (meth)acrylate functional groups are introduced; and alkyleneglycol multifunctional (meth)acrylate.

For reference, "cross-linked polymer" as used herein means a state wherein water soluble ethylenically unsaturated monomers are polymerized, and may include all the moisture contents or diameter ranges. Among the cross-linked polymer, cross-linked polymer after polymerization and before drying, having moisture content of about 40 wt % or more can be designated as hydrogel polymer. And, "base resin" or "base resin powder" means those made in the form of powder by drying and milling the cross-linked polymer. And, "superabsorbent polymer" means the cross-linked polymer or base resin itself according to the context, or it is used to include those made suitable for productization by passing through additional processes, for example, surface cross-linking, powder reassemblage, drying, milling, classification, and so on, of the base resin.

And, as used herein, the description that (meth)acrylate functional groups are introduced on the basal surface or edge means that (meth)acrylate groups are chemically bonded to the surface or edge region of the nanoclay.

As the result of the experiments of the present inventors, it was confirmed that if modified nanoclay on the basal surface or edge of which (meth)acrylate functional groups are introduced and alkyleneglycol multifunctional (meth)acrylate are included in the monomer composition for forming cross-linked polymer, which is a base resin of superabsorbent polymer, and polymerization is conducted, the modified nanoclay and the alkyleneglycol multifunctional (meth)acrylate may act as internal cross-linking agents to form a dual cross-linking structure and achieve an appropriate cross-linking density.

And, non-modified nanoclay has low reactivity with cross-linked polymer, and thus, it frequently leaves from the cross-linked polymer, or the nanoclay particles coagulates with each other, while the modified nanoclay is chemically bonded to cross-linked polymer to prevent the nanoclay from leaving from the cross-linked polymer. Consequently, it was confirmed that cross-linked polymer comprising a cross-linking structure derived from the alkyleneglycol multifunctional (meth)acrylate and modified nanoclay can prepare and provide superabsorbent polymer simultaneously having improved centrifuge retention capacity (CRC) and absorbency under pressure (AUP), and exhibiting improved permeability, and completed the present invention.

The superabsorbent polymer according to one embodiment of the invention comprises base resin powder comprising cross-linked polymer wherein polymer chains formed by the polymerization of water soluble ethylenically unsaturated monomers are cross-linked with the cross-linkable functional groups of alkyleneglycol multifunctional (meth)acrylate through the (meth)acrylate functional groups of modified nanoclay.

Thus, the superabsorbent polymer according to one embodiment of the invention has a structure wherein cross-linked polymers are chemically connected through the bondings derived from modified nanoclay on the basal surface or edge of which (meth)acrylate functional groups are introduced, and alkyleneglycol multifunctional (meth)acrylate.

As such, the superabsorbent polymer according to one embodiment of the invention has an internal cross-linking structure derived from alkyleneglycol multifunctional (meth)acrylate and modified nanoclay, may form a dual cross-linking structure and achieve an appropriate cross-linking density, and thus, may have improved centrifuge retention capacity and absorbency under pressure, which are conflicting properties, and exhibit excellent characteristics. And, since the modified nanoclay occupies a certain space between the cross-linked polymers, the superabsorbent polymer exhibits improved moisture absorption speed, and maintains its shape well even in the swollen state after water absorption, thus exhibiting excellent permeability.

FIG. 1 schematically shows the novel dual cross-linking structure of the superabsorbent polymer according to one embodiment of the present invention, in comparison with the cross-linking structure of the existing superabsorbent polymer.

Due to such dual cross-linking structure and optimized cross-linking density, the superabsorbent polymer of one embodiment of the present invention has balanced properties of centrifuge retention capacity, absorbency under pressure, and permeability, which are required in the superabsorbent polymer, and may exhibit more improved performance.

The superabsorbent polymer of one embodiment comprises cross-linked polymer wherein water soluble ethylenically unsaturated monomers are cross-linked, as baser resin powder.

Since the superabsorbent polymer of one embodiment uses, as explained above, modified nanoclay on the basal surface or edge of which (meth)acrylate functional groups are introduced and alkyleneglycol multifunctional (meth) acrylate as internal cross-linking agents in the process of polymerizing the water soluble ethylenically unsaturated monomers to form cross-linked polymer, the nanoclay is chemically bonded to the polymer chains of the cross-linked polymer through the bondings at the (meth)acrylate functional groups, and an internal cross-linking structure is formed by alkyleneglycol multifunctional (meth)acrylate. Thereby, centrifuge retention capacity and absorbency under pressure are simultaneously improved, thus exhibiting excellent properties.

In the superabsorbent polymer of one embodiment, as the water soluble ethylenically unsaturated monomers, one or more selected from the group consisting of anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-(meth) acryloylpropane sulfonic acid, or 2-(meth)acrylamide-2-methylpropane sulfonic acid and salts thereof; non-ionic hydrophilic group-containing monomers such as (meth) acrylamide, N-substituted (meth) acrylamide, 2-hydroxyethyl (meth)acrylate, 2-hydroxypropyl (meth)acrylate, methoxypolyethyleneglycol (meth)acrylate or polyethyleneglycol (meth)acrylate; and amino group-containing unsaturated monomers such as (N,N)-dimethylaminoethyl (meth)acrylate or (N,N)-dimethylaminpropyl (meth)acrylamide and quarternized products thereof may be used, Among them, acrylic acid or salts thereof, for example, acrylic acid of which at least a part is neutralized and/or alkali metal salts such as sodium salts thereof may be used, and by using such monomers, superabsorbent polymer having more excellent properties may be prepared. In case the alkali metal salt of acrylic acid is used, acrylic acid may be neutralized with a basic compound such as caustic soda (NaOH) before use. Wherein, the neutralization degree of the water soluble ethylenically unsaturated monomers may be controlled to about 50 to about 95% or about 70 to about 85%, within which range superabsorbent polymer with excellent centrifuge retention capacity may be provided without concern about precipitation at the time of neutralization In the superabsorbent polymer of the above explained embodiment, in order to form a dual cross-linking structure and achieve an appropriate cross-linking density in the cross-linked polymer, modified nanoclay on the basal surface or edge of which (meth)acrylate functional groups are introduced is used.

The modified nanoclay is modified with (meth)acrylate functional groups on the basal surface or edge, thus maintaining transparency and dispersibility in the monomer composition for synthesizing superabsorbent polymer, and acts as an internal cross-linking agent of the superabsorbent polymer to form a dual cross-linking structure, thereby improving the cross-linking degree of the polymer. And, the modified nanoclay may also act as a kind of filler providing a space between cross-linked polymers, thus improving permeability and gel strength.

Figure 2:
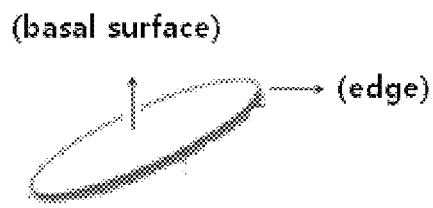
FIG. 2 schematically shows the structure of the nanoclay according to one embodiment of the present invention.

FIG. 2 schematically shows the structure of the nanoclay according to one embodiment of the present invention.

Referring to FIG. 2, the structure of the nanoclay according to one example of the present invention comprises a basal surface and an edge, on which silanol groups (SiOH) are formed.

In case non-modified nanoclay is introduced into a monomer composition for synthesizing superabsorbent polymer, particles tend to coagulate with each other due to the charge of the basal surface or edge of the nanoclay, and thus, dispersibility in the monomer composition becomes worse and opacity increases, and the viscosity of the monomer composition increases. And, if nanoclay treated with a dispersant is added or a separate dispersant is added to the monomer composition so as to improve the problems, although dispersibility in the monomer composition is improved, the added dispersant may remain or float in the monomer composition, thus degrading the quality of superabsorbent polymer.

In order to overcome the above problems, the nanoclay used in the superabsorbent polymer and the method for preparing the same according to the present invention is characterized in that (meth)acrylate functional groups are introduced on the basal surface or edge of the nanoclay particles for modification.

As a modifier for introducing (meth)acrylate functional groups into the nanoclay, for example, compounds such as 3-methacryloxypropyltrimethoxysilane (MPTMS), glycidyl (meth)acrylate, (meth)acrylic acid, n-hydroxysuccinimide ester, and so on, may be used, but the present invention is not limited thereto.

According to one embodiment of the present invention, preferably, modified nanoclay wherein about 2 to about 200 (meth)acrylate functional groups are introduced per one nanoclay particle may be used, and more preferably, modified nanoclay wherein about 10 to about 100 (meth)acrylate functional groups are introduced per one nanoclay particle may be used.

If the nanoclay is modified with less than 2 (meth)acrylate functional groups per one nanoclay particle, it may not sufficiently perform a function as a cross-linking agent, and if it is modified with greater than 200 (meth)acrylate functional groups per one nanoclay particle, the edge of the nanoclay may be hydrophobicized and transparency in the monomer composition may not be maintained, and thus, in the case of photopolymerization, light transmittance may decrease and polymerization may not be properly achieved. Here, the transparency is defined as a transmittance passing through a monomer composition with a thickness of 2 mm at the short wavelength visible light area of 400 nm to 500 nm, and when the light transmittance is about 50% or more, preferably about 60% or more, more preferably about 70% or more, it is judge to be transparent.

And, according to one embodiment of the present invention, the modified nanoclay may be that modified by additionally introducing hydrophilic functional groups on the basal surface or edge in addition to the (meth)acrylate functional groups Here, the additionally introduced hydrophilic functional groups are not specifically limited as long as they have hydrophilicity, but preferably, may be one or more functional groups selected from the group consisting of a hydroxy, an epoxy, an amine and an isocyanate group.

According to one embodiment of the present invention, preferably, modified nanoclay wherein about 100 to about 200 hydrophilic functional groups are introduced per one nanoclay may be used, more preferably, modified nanoclay wherein about 130 to about 190 hydrophilic functional groups are introduced per one nanoclay may be used, and most preferably, modified nanoclay wherein about 140 to about 180 hydrophilic functional groups are introduced per one nanoclay may be used. When the hydrophilic functional groups are within the above range, transparency and stability in the monomer composition may be secured, thus preventing coagulation of nanoclay particles.

According to one embodiment of the present invention, as the nanoclay particles, swellable or non-swellable clay may be used. The swellable clay is a lamellar organic substance with water absorption, and montmorillonite, saponite, nontronite, laponite, beidelite, hectorite, vermiculite, or magadiite, and so on, may be used, and as the non-swellable clay, kaolin, serpentine, or mica, and so on, may be used.

According to one embodiment of the present invention, nanoclay having a platy structure, a diameter of about 10 to about 500 nm, preferably about 10 to about 100 nm, and a height of about 0.1 to about 100 nm, preferably about 0.1 to about 20 nm may be used. If the nanoclay has a diameter less than 10 nm and a height less than 0.1 nm, the influence on the property improvement of superabsorbent polymer may be insignificant, and if it has a diameter greater than 500 nm and height greater than 100 nm, due to strong interlayer attraction force between the nanoclay particles, it may be difficult to achieve uniform dispersion in aqueous system, it may be difficult to uniformly modify nanoclay, and even after dispersion, it may be difficult to secure transparency, thus hindering photopolymerization.

The above explained modified nanoclay may be prepared by adding a modifier comprising (meth)acrylate groups to nanoclay particles to bind the silanol groups on the basal surface or edge of the nanoclay with (meth)acrylate by a sol-gel reaction, thereby introducing (meth)acrylate groups on the basal surface or edge of the nanoclay.

According to one embodiment of the present invention, in the method of preparing the modified nanoclay, when the modifier comprising (meth)acrylate groups are added to the nanoclay particles, water or a mixed solution of water and alcohol may be used as a solvent. Here, the alcohol is not specifically limited, but preferably, those having a boiling point of 100° C. or less may be used.

And, in the method of preparing the modified nanoclay, in case a mixed solution of water and alcohol is used as a solvent in the modifying step of nanoclay, a step of removing the alcohol may be further included. The step of removing the alcohol is not specifically limited, and it may be removed by methods commonly used in the technical field to which the present invention pertains. For example, the alcohol may be removed in the mixed solvent through distillation under reduced pressure.

In the method of preparing the modified nanoclay, when the modifier comprising (meth)acrylate groups are added to the nanoclay particles, it may be added such that the (meth)acrylate groups may be introduced (modified) at a ratio of about 0.04 to about 4.0 μmol/m$^2$, more preferably, at a ratio of about 0.21 to about 2.0 μmol/m$^2$, based on the surface area of the nanoclay. If modification is made with less than 0.04 μmol/m$^2$ of (meth)acrylate groups, a function as a cross-linking agent may not be appropriately exhibited, and if modification is made with greater than 4.0 μmol/m$^2$ of (meth)acrylate groups, transparency in the monomer composition may not be maintained, and thus, photopolymerization may not be properly achieved.

The degree of modification can be seen on the basis of the calculation result of TGA (thermal gravimetric analysis) loss (theoretical weight loss) according to modification by the following Equation 1.

$$T(TGA\ Loss\ \%) = A \times \frac{C}{(100 + B \times C)} \times 100\%\ \ \ \ [\text{Equation 1}]$$

A: weight ratio thermally decomposed in the modifier
B: weight ratio remaining after a sol-gel reaction of the modifier and the nanoclay
C: weight (g) of the modifier participating in the modification per 100 g of nanoclay For example, when 3-methacryloxypropyltrimethoxysilane (MPTMS) is used as a modifier for introducing (meth)acrylate functional groups into nanoclay, TGA loss of the above Equation 1 is derived only from the methacryloxypropyl group. Calculating this, A is 0.516. Since 3 CH$_3$ groups get out of the trimethoxysilane group in the sol-gel reaction of MPTMS and nanoclay, B has a value of 0.818.

Using the above Equation 1, the weight (C) of the modifier participating in the modification is represented by the following Equation 2.

$$C(g) = \frac{100 \times T}{(100 \times A - B \times T)}\ \ \ \ [\text{Equation 2}]$$

A: weight ration thermally decomposed in the modifier
B: weight ratio remaining after a sol-gel reaction of a modifier and nanoclay
C: weight (g) of a modifier participating in modification per 100 g of nanoclay
T: TGA loss (%)

Figure 3:
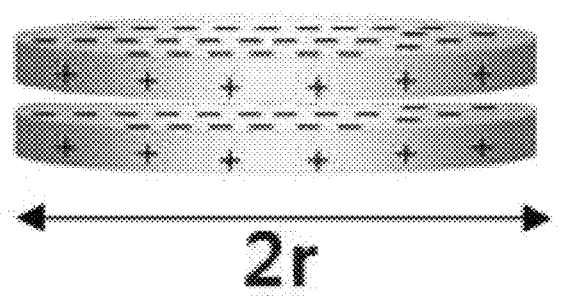
FIG. 3 schematically shows the stacked structure of the nanoclay according to one embodiment of the present invention.

And, the specific surface area of the nanoclay particles may be obtained through BET analysis, basically in the state of 2 to 3 nanoclay particles being stacked, due to the strong silicate interlayer attraction force of the nanoclay FIG. 3 schematically shows the stacked structure of the nanoclay according to one embodiment of the present invention.

Supposing that 2 nanoclay particles are stacked as shown in FIG. 3, the specific surface area of the edge of the nanoclay is represented by the following Equation 3.

$$L(m^2/g) = \frac{2}{rd}\ \ \ \ [\text{Equation 3}]$$

d: density of nanoclay particle (g/cm$^3$)
r: radius of nanoclay particle (nm)
L: specific surface area of the edge of nanoclay (m$^2$/g)

Since, in the nanoclay particle, a part where a sol-gel reaction with a modifier mainly occurs is the edge of the nanoclay where many silanol groups exist, L is supposed as the specific surface area of the edge of the nanoclay particle in the following Equations 3 and 4, however, the sol-gel reaction with the modifier may occur even at the basal surface.

Here, the amount (D) of the modifier participating in modification per unit area may be calculated by the following Equation 4.

$$D(\mu mol/m^2) = \frac{\frac{C}{M} \times 10^6}{100 \times L} \quad \text{[Equation 4]}$$

M: molecular weight of modifier

L: specific surface area of the edge of nanoclay particle used (m²/g)

C: weight (g) of modifier participating in the modification per 100 g of nanoclay For example, for a nanoclay particle with a density of 2.53 g/cm² and a radius of 15 nm, when MPTMS (MW=248.35 g/mol), TGA loss (200 r to 800° C. section) is 2 wt %, the weight (C) of the modifier participating in the modification per 100 g of nanoclay is 4.2 g, and the specific surface area (L) of the edge is 52.7 m²/g, and the amount (D) of the modifier participating in modification per unit area is 3.2 μmol/m².

In the method for preparing modified nanoclay, in addition to the step of adding a modifier comprising (meth)acrylate groups to the nanoclay particles to modify, a step of adding a hydrophilic modifier to the nanoclay particle may be further conducted.

The hydrophilic modifier may be added simultaneously with the (meth)acrylate, or it may be added after adding the (meth)acrylate.

According to one embodiment of the present invention, in the method for preparing the modified nanoclay, hydrophilic modifiers represented by the following Chemical Formula 1 may be used.

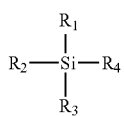

[Chemical Formula 1]

In the Chemical Formula 1, $R^1$ is OR' or Cl, $R^2$ and $R^3$ are Cl or R' ($R'=C_nH_{2n+1}$ (n=1~10)), $R^4$ comprises one functional group selected form the group consisting of a hydroxy, an epoxy, an amine and an isocyanate group at the end, and has a carbon number of 3 or more.

When adding the modifier comprising hydrophilic functional groups, it may be added such that modification may be made at a ratio of about 2.0 μmol/m² or more, based on the nanoclay. When the modification is made with the hydrophilic functional group at about 2.0 μmol/m² or more, transparency and stability in the monomer composition may be secured, thus preventing coagulation of nanoclay particles.

And, the superabsorbent polymer according to one embodiment of the present invention further comprises a cross-linking structure derived from alkyleneglycol multifunctional (meth)acrylate, in addition to the modified nanoclay, of the cross-linked polymer.

More specific examples of the alkyleneglycol multifunctional (meth)acrylate may include one or more selected from the group consisting of polyethyleneglycol diacrylate (PEGDA), glycerin diacrylate, glycerin triacrylate, non-modified or ethoxylated trimethylol triacrylate (TMPTA), hexanediol diacrylate, and triethyleneglycol diacrylate, but are not limited thereto.

Since the cross-linked polymer according to one embodiment of the present invention, as explained above, has a dual cross-linking structure derived from modified nanoclay on the basal surface or edge of which (meth)acrylate functional groups are introduced and alkyleneglycol multifunctional (meth)acrylate, it may exhibit excellent centrifuge retention capacity together with more improved solution permeability and absorbency under pressure. Thus, the super absorbent polymer according to the present invention may be preferably applied for various hygienic goods such as diaper and exhibit very excellent properties on the whole.

The cross-linked polymer may be productized in the form of particles with a diameter of about 150 to about 850 μm, through the processes of drying, milling, classification and surface cross-linking, and so on, so as to control the properties of the finally productized superabsorbent polymer powder.

The superabsorbent polymer according to one embodiment of the present invention may exhibit centrifuge retention capacity (CRC) of about 30 g/g to about 45 g/g, preferably about 35 g/g to about 40 g/g, absorbency under pressure (AUP) of 0.7 psi of about 20 g/g to about 35 g/g, preferably about 20 g/g to about 30 g/g, and thus, may exhibit excellent centrifuge retention capacity and absorbency under pressure. Particularly, in the case of absorbency under pressure, compared to the case wherein the modified nanoclay of the present invention is not used, the improvement effect of absorbency under pressure of about 40% or more, for example about 40 to about 80%, or about 40 to about 60% may be exhibited.

The centrifuge retention capacity (CRC) may be measured according to EDANA method WSP 241.2, and the absorbency under pressure (AUP) may be measured according to EDANA method WSP 242.2.

The method for preparing superabsorbent polymer according to another aspect of the present invention comprises the steps of preparing a monomer composition comprising water soluble ethylenically unsaturated monomers; a polymerization initiator; modified nanoclay on the surface or edge of which (meth)acrylate functional groups are introduced; and alkyleneglycol multifunctional (meth)acrylate; and progressing thermal polymerization or photopolymerization of the monomer composition to form hydrogel polymer.

In the method of preparing superabsorbent polymer, as the monomer composition, which is the raw material of the superabsorbent polymer, a composition comprising water soluble ethylenically unsaturated monomers, a polymerization initiator, modified nanoclay, and alkyleneglycol multifunctional (meth)acrylate, and so on, is prepared.

In the method of preparing superabsorbent polymer, the water soluble ethylenically unsaturated monomers are not specifically limited as long as they are commonly used in the preparation of superabsorbent polymer, but one or more selected from the group consisting of anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methylpropane sulfonic acid and salts thereof; non-ionic hydrophilic group-containing monomers such as (meth)acrylamide, N-substituted (meth) acrylamide, 2-hydroxyethyl(meth)acrylate, 2-hydroxypropyl(meth) acrylate, methoxypolyethyleneglycol (meth) acrylate or polyethyleneglycol (meth) acrylate; and amino group-containing unsaturated monomers such as (N,N)-dimethylaminoethyl(meth)acrylate or (N,N)-dimethylaminpropyl(meth)acrylamide and quarternized products thereof may be used. Among them, acrylic acid or salts thereof, for example, acrylic acid of which at least a part is neutralized and/or alkali metal salts such as sodium salts thereof may be used, and by using such monomers, absorbency may be improved, thus enabling preparation of superabsorbent polymer having more excellent properties.

The monomer composition for preparing superabsorbent polymer may further comprise an alkali metal salt or a basic compound that can neutralize the water soluble ethylenically unsaturated monomers.

As the alkali metal salt or basic compound capable of neutralizing the water soluble ethylenically unsaturated monomers, alkali metal salts such as acrylic acid sodium salt or alkali compounds such as caustic soda (NaOH) may be used. Here, the neutralization degree of the water soluble ethylenically unsaturated monomers may be controlled to about 50 to about 95% or about 70 to about 85%, within which range superabsorbent polymer with excellent centrifuge retention capacity may be provided without concern about precipitation at the time of neutralization The concentration of the water soluble ethylenically unsaturated monomers may be about 20 to about 60 parts by weight, preferably about 40 to about 60 parts by weight, based on 100 parts by weight of a monomer composition comprising the raw materials of the superabsorbent polymer and a solvent, and it may be controlled to an appropriate concentration considering a polymerization time and reaction conditions, and so on. If the concentration of the monomers is too low, the yield of superabsorbent polymer may be low and economical problems may occur, and if the concentration is too high, problems in terms of the process such as precipitation of a part of the monomers or low milling efficiency at the time of milling the polymerized hydrogel polymer may occur, and the properties of superabsorbent polymer may be degraded.

And, the degree of neutralization of the water soluble ethylenically unsaturated monomers may be about 50 to about 95%, preferably about 70 to about 85%, and if the degree of neutralization is low, water absorption may be lowered, and if the degree of neutralization is high, the monomers may be precipitated thus rendering it difficult to prepare superabsorbent polymer. The monomer composition neutralized as described above may have a pH in the range of about 5 to about 7.

The monomer composition for preparing superabsorbent polymer comprises alkyleneglycol multifunctional (meth) acrylate as an internal cross-linking agent for introducing a cross-linking structure into the cross-linked polymer.

More specific examples of the alkyleneglycol multifunctional (meth)acrylate may include one or more selected from the group consisting of polyethyleneglycol diacrylate, glycerin diacrylate, glycerin triacrylate, non-modified or ethoxylated trimethylol triacrylate, hexanediol diacrylate, and triethyleneglycol diacrylate, but are not limited thereto.

The alkyleneglycol multifunctional (meth)acrylate may be included in the amount of about 0.001 to about 2 parts by weight, preferably about 0.01 to about 1 parts by weight, more preferably about 0.1 to about 1 part by weight, based on 100 parts by weight of the water soluble ethylenically unsaturated monomers, within which range an appropriate cross-linking density may be achieved.

In the method for preparing superabsorbent polymer according to one embodiment of the present invention, the monomer composition comprises the above explained modified nanoclay.

The modified nanoclay is modified with (meth)acrylate functional groups on the basal surface or edge, thus maintaining transparency and dispersibility in the monomer composition for synthesizing superabsorbent polymer, and it may act as an internal cross-linking agent of the cross-linked polymer to form a dual cross-linking structure, thereby improving the cross-linking degree of superabsorbent polymer.

More detailed explanations, specific examples, preparation method, and so on, of the modified nanoclay are as explained above, and further explanations thereof are omitted.

According to one embodiment of the present invention, the monomer composition may comprise, based on 100 parts by weight of the water soluble ethylenically unsaturated monomers, about 0.01 to about 10 parts by weight, preferably about 0.01 to about 5 parts by weight, more preferably about 0.01 to about 1 part by weight of the modified nanoclay. If the content of the modified nanoclay is less than 0.01 parts by weight, the effect of improving centrifuge retention capacity, absorbency under pressure, and so on, of superabsorbent polymer may be insignificant, and if it is greater than 10 parts by weight, dispersibility or transparency of the monomer composition may be degraded, thus degrading the properties.

And, according to one embodiment of the present invention, the monomer composition may comprise the modified nanoclay and the alkyleneglycol multifunctional (meth) acrylate at a weight ratio of about 1:0.05 to about 1:10, preferably about 1:0.05 to about 1:5, more preferably about 1:1 to 1:5. When the monomer composition comprising the modified nanoclay and the alkyleneglycol multifunctional (meth)acrylate at the above explained weight ratio is polymerized, an appropriate dual cross-linking structure and a more optimized cross-linking degree may be achieved, and thus, more improved absorbency under pressure may be exhibited without degradation of centrifuge retention capacity.

According to one embodiment of the present invention, the monomer composition, if necessary, may further comprises other internal cross-linking agents, besides the alkyleneglycol multifunctional (meth)acrylate and the modified nanoclay. As the internal cross-linking agent, a cross-linking agent having one or more functional groups capable of reacting with the water soluble substituents of the water soluble ethylenically unsaturated monomers, and having one or more ethylenically unsaturated groups; or a cross-linking agent having two or more functional groups capable of reacting with the water soluble substituents of the monomers and/or the water soluble substituents formed by the hydrolysis of the monomers; may be used.

According to one embodiment of the present invention, the monomer composition comprises a polymerization initiator for polymerizing the water soluble ethylenically unsaturated monomers, and as the polymerization initiator, a photopolymerization initiator may be used for photopolymerization, and a thermal polymerization initiator may be used for thermal polymerization, and so on.

However, also in the case of photopolymerization, since a certain amount of heat is generated by irradiation such as UV irradiation, and so on, and heat is generated to some degree according to the progress of the polymerization reaction, which is an exothermic reaction, a thermal polymerization initiator may be additionally used.

The photopolymerization initiator is not limited in terms of its construction as long as it is a compound capable of forming a radical by light such as UV.

As the photopolymerization initiator, for example, one or more selected from the group consisting of benzoin ether, dialkyl acetophenone, hydroxyl alkylketone, phenyl glyoxylate, benzyldimethyl ketal, acyl phosphine and α-aminoketone may be used. Meanwhile, as specific examples of acyl phosphine, commonly used lucirin TPO, namely, 2,4,6-trimethyl-benzoyl-trimethyl phosphine oxide may be used. More various photoinitiators are well specified in Reinhold Schwalm, "UV Coatings: Basics, Recent Developments and New Application (Elsevier 2007)" p. 115, and are not limited to the above described examples.

The photopolymerization initiator may be included in the concentration of about 0.01 to about 1.0 part by weight, based on 100 parts by weight of the monomer composition. If the concentration of the photopolymerization initiator is too low, polymerization speed may become slow, and if it is too high, the molecular weight of superabsorbent polymer may be small and the properties may become non-uniform.

The thermal polymerization initiator that can be used in the preparation method of the present invention is not specifically limited, but preferably, one or more initiators selected form the group consisting of persulfate initiators, azo initiators, hydrogen peroxide, and ascorbic acid may be used. Specifically, examples of the persulfate initiators may include sodium persulfate ($Na_2S_2O_8$), potassium persulfate ($K_2S_2O_8$), ammonium persulfate (($NH_4)_2S_2O_8$), and so on, examples of azo initiators may include 2,2-azobis(2-amidinopropane) dihydrochloride, 2,2-azobis-(N, N-dimethylene) isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid), and so on. More various thermal polymerization initiators are well specified in Odian, "Principle of Polymerization (Wiley, 1981)", p. 203, and are not limited to the above described examples.

The thermal polymerization initiators may be included in the concentration of about 0.001 to about 0.5 parts by weight, based on 100 parts by weight of the monomer composition. If the concentration of the thermal polymerization initiator is too low, additional thermal polymerization hardly occurs and the effects according to the addition of the thermal polymerization initiators may be insignificant, and if the concentration of the thermal polymerization initiator is too high, the molecular weight of the superabsorbent polymer may be small and the properties may become non-uniform.

In the preparation method of the present invention, the monomer composition may further comprise additives such as a thickener, a plasticizer, a preservation stabilizer, an antioxidant, and so on, as necessary.

Since the monomer composition for preparing superabsorbent polymer comprises the above explained modified nanoclay, the transparency of the monomer composition may be 50% or more, and the precipitation speed of the added modified nanoclay may be 5 μm/s or less.

The above explained raw materials such as water soluble ethylenically unsaturated monomers, alkyleneglycol multifunctional (meth)acrylate, modified nanoclay, polymerization initiator, other internal cross-linking agents and additives may be prepared in the form of a monomer composition solution dissolved in a solvent.

Here, the solvent that can be used is not limited in terms of its construction as long as it can dissolve the above explained components, and for example, one or more elected from the group consisting of water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, and so on, may be used in combination.

The solvent may be included in the remaining amount expect the above explained components, based on the total amount of the monomer composition.

Meanwhile, a method of thermally polymerizing or photopolymerizing the monomer composition to form hydrogel polymer is not specifically limited in terms of its construction as long as it is a commonly used polymerization method.

Specifically, the polymerization method is largely classified into thermal polymerization and photopolymerization according to energy source, and commonly, thermal polymerization may be progressed in a reactor equipped with a stirring axis such as a kneader, and photopolymerization may be progressed in a reactor equipped with a movable conveyer belt, but the above explained polymerization methods are no more than examples, and the present invention is not limited to the above explained polymerization methods.

For example, hydrogel polymer obtained by supplying hot wind in a reactor such as a kneader equipped with a stirring axis as explained above or heating the reactor, and discharged to the outlet of the reactor, may be in the form of a few centimeters to a few millimeters, according to the shape of the stirring axis. Specifically, the size of obtained hydrogel polymer may vary according to the concentration of the introduced monomer composition and the introduction speed, and so on, and commonly, hydrogel polymer having a weight average particle diameter of 2 to 50 mm may be obtained.

And, in case photopolymerization is progressed in a reactor equipped with a movable conveyer belt as explained above, commonly obtained hydrogel polymer may be sheet-shaped hydrogel polymer having a width of the belt. Here, the thickness of the polymer sheet may vary according to the concentration of the introduced monomer composition and the introduction speed, but, commonly, it is preferable to supply a monomer composition so that a sheet-shaped polymer having a thickness of about 0.5 to about 5 cm may be obtained. If a monomer composition is supplied such that the thickness of sheet-shaped polymer may become too thin, production efficiency is low, and if the thickness of sheet-shaped polymer is greater than 5 cm, due to the excessively thick thickness, a polymerization reaction may not uniformly occur over the whole thickness.

Wherein, the moisture content of the hydrogel polymer obtained by such a method may be commonly about 40 to about 80 wt %. Meanwhile, "moisture content" as used herein is the content of occupying moisture based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. At this time, while the temperature is raised from room temperature to about 180° C. and then maintained at 180° C., and the total drying time is set to 20 minutes including a temperature raising step of 5 minutes, the moisture content is measured.

The hydrogel polymer prepared by the above method comprises cross-linked polymer wherein the polymerized polymer chains of water soluble ethylenically unsaturated monomers are cross-linked with alkyleneglycol multifunctional (meth)acrylate cross-linkable functional groups, through the (meth)acrylate functional groups of modified nanoclay.

Next, a step of drying the obtained hydrogel polymer is conducted.

At this time, if necessary, in order to increase the efficiency of the drying step, a step of coarse crushing may be passed before the drying.

Here, the crusher used is not limited in terms of its construction, and specifically, it may include any one selected from the group consisting of vertical pulverizer, turbo cutter, turbo grinder, rotary cutter mill, cutter mill, disc mill, shred crusher, crusher, chopper and disc cutter, but is not limited to the above examples.

The crushing step may be progressed such that the particle diameter of hydrogel polymer may become about 2 to about 10 mm Crushing to the particle diameter of less than 2 mm is not technically easy due to the high moisture content of hydrogel polymer, and it may cause coagulation of crushed particles. Meanwhile, if crushing to the particle diameter greater than 10 mm, the effect of increasing the efficiency of the subsequent drying step may be insignificant.

The hydrogel polymer which is crushed as described above, or the hydrogel polymer immediately after polymerization, without being crushed, is dried. Wherein, the drying temperature may be about 150 to about 250° C. If the drying temperature is less than 150° C., a drying time may too lengthen, and the properties of the finally formed superabsorbent polymer may be degraded, and if the drying temperature is greater than 250° C., only the surface of polymer may be dried, thus generating powder in the subsequent milling process, and the properties of the finally formed superabsorbent polymer may be degraded. Thus, the drying may be progressed at a temperature of about 150 to about 200° C., preferably about 160 to 1 bout 180° C.

Meanwhile, considering the process efficiency, the drying may be progressed for about 20 to about 90 minutes, but is not limited thereto.

The drying method of the drying step is not limited as long as it is commonly used as a drying process of hydrogel polymer. Specifically, the drying step may be progressed by hot wind supply, infrared irradiation, ultrahigh frequency wave irradiation, or UV irradiation, and so on. The moisture content of polymer after progressing such a drying step may be about 0.1 to about 10 wt %.

Next, the dried polymer obtained by passing the drying step is milled.

The polymer powder obtained after the milling step may have a particle diameter of about 150 to about 850 μm. As the mill used for milling to such a particle diameter, specifically, a pin mill, a hammer mill, a screw mill, a roll mill, a disc mill or a jog mill, and so on, may be used, but is not limited thereto.

And, in order to control the properties of the superabsorbent polymer powder finally productized after such a milling step, a separate step of classifying the polymer powder obtained after milling according the particle diameter may be passed. Preferably, polymer having a particle diameter of about 150 to about 850 μm may be classified, and only the polymer powder having such particle diameters may be passed through a surface cross-linking reaction step and productized.

According to one embodiment of the present invention, a surface cross-linking agent may be added to the milled polymer, thus additionally progressing a surface cross-linking reaction.

The surface cross-linking is a step of increasing the cross-linking density in the vicinity of the surface of superabsorbent polymer particle in relation to the cross-linking density inside of the particle. In general, the surface cross-linking agent is coated on the surface of superabsorbent polymer particle. Thus, this reaction occurs on the surface of superabsorbent polymer particle, and improves the cross-linkability on the surface of the particle without substantially influencing on the inside of the particle. Thus, the surface cross-linked superabsorbent polymer particle has higher cross-linking density in the vicinity of the surface than inside of the particle.

Here, the surface cross-linking agent is not limited in terms of its construction as long as it is a compound capable of reacting with the functional groups of the polymer.

Preferably, in order to improve the properties of produced superabsorbent polymer, as the surface cross-linking agent, one or more selected from the group consisting of polyhydric alcohol compounds; epoxy compounds; polyamine compounds; haloepoxy compounds; condensation products of haloepoxy compounds; oxazoline compounds; mono-, di- or polyoxazolidinone compounds; circular urea compounds; polyvalent metal salts; and alkylene carbonate compounds may be used.

Specifically, as the examples of the polyhydric alcohol compounds, one or more selected from the group consisting of mono-, di-, tri-, tetra- or polyethyleneglycol, monopropyleneglycol, 1,3-propanediol, dipropyleneglycol, 2,3,4-trimethyl-1,3-pentanediol, polypropyleneglycol, glycerol, polyglycerol, 2-butene-1,4-diol, 1,4-butanediol, 1,3-butanediol, 1,5-pentanediol, 1,6-hexanediol, and 1,2-cyclohexanedimethanol may be used.

And, as the epoxy compounds, ethylene glycol diglycidyl ether and glycidol, and so on, may be used, and as the polyamine compounds, one or more selected from the group consisting of ethylenediamine, diethylenetriamine, triethylenetetraamine, tetraethylenepentamine, pentaethylenehexamine, polyethyleneimine, and polyamide polyamine may be used.

And, as the haloepoxy compounds, epichlorohydrin, epibromohydrin, and α-methylepichlorohydrin may be used. And, as the mono-, di- or polyoxazolidinone compounds, for example, 2-oxazolidinone, and so on, may be used.

And, as the alkylene carbonate compounds, ethylene carbonate, and so on, may be used. They may be used alone or in combinations. Meanwhile, in order to increase the efficiency of the surface cross-linking process, it is preferable to use one or more polyhydric alcohol compounds, and more preferably, polyhydric alcohol compounds having a carbon number of 2 to 10 may be used.

The content of the surface cross-linking agent added may be appropriately selected according to the kind of added surface cross-linking agent or reaction conditions, but commonly, based on 100 parts by weight of the polymer, about 0.001 to about 5 parts by weight, preferably about 0.01 to about 3 parts by weight, more preferably about 0.05 to about 2 parts by weight may be used.

If the content of the surface cross-linking agent is too low, a surface cross-linking reaction hardly occurs, and if it is greater than 5 parts by weight, based on 100 parts by weight of the polymer, due to the progression of an excessive cross-linking reaction, degradation of absorption capacity and properties may be generated.

The method of adding the surface cross-linking agent to the polymer is not limited in terms of its construction. A method of putting the surface cross-linking agent and polymer powder in a reactor and mixing them, a method of spraying the surface-cross-linking agent to polymer powder, a method of continuously supplying polymer and the surface cross-linking agent to a continuously operated mixer and mixing them, and so on, may be used.

At the time of adding the surface cross-linking agent, water may be additionally mixed together and added. In case water is added, the surface cross-linking agent may be uniformly dispersed in the polymer. Here, it is preferable that water is added at a ratio of about 1 to about 10 parts by weight, based on 100 parts by weight of the polymer, so as to induce uniform dispersion of the surface cross-linking agent and prevent lumping of polymer powder, and simultaneously, to optimize the penetration depth of the cross-linking agent.

By heating polymer particles to which the surface cross-linking agent is added at a temperature of about 140 to about 220° C., preferably about 160 to about 200° C. for about 15 to about 90 minutes, preferably about 20 to about 80 minutes, a surface cross-linking reaction and drying may be simultaneously achieved. If the temperature of the cross-linking reaction is less than 140° C., the surface cross-linking reaction and the reaction of aluminosilicate may not occur, and if it is greater than 220° C., foreign substance and odor may be generated due to carbonization, or due to the excessive reaction, the properties may be degraded and stable process operation conditions may not be secured. And, if the cross-linking reaction time is too short as less than 15 minutes, a sufficient cross-linking reaction may not occur, and if it is greater than 90 minutes, due to the excessive surface cross-linking reaction, polymer particles may be damaged thus generating property degradation.

The temperature raising means for the surface cross-linking reaction are not specifically limited. A heating medium may be supplied, or a heating source may be directly supplied for heating. Wherein, the kind of heating medium that can be used may include temperature raised fluid such as steam, hot wind, hot oil, and so on, but is not limited thereto, and the temperature of supplied heating medium may be appropriately selected considering the means of heating medium, temperature raising speed, and aimed temperature. Meanwhile, the directly supplied heating source may include electric heating, gas heating, but is not limited thereto.

The superabsorbent polymer obtained according to the preparation method of the present invention has improved centrifuge retention capacity, absorbency under pressure and permeability.

The superabsorbent polymer obtained according to the preparation method of the present invention has excellent centrifuge retention capacity (CRC) and absorbency under pressure (AUP) wherein the centrifuge retention capacity as measured according to EDANA method WSP 241.2 is about 30 g/g to about 45 g/g, preferably about 35 g/g to about 40 g/g, and the absorbency under pressure as measured according to EDANA method WSP 242.2 is about 20 g/g to about 35 g/g, preferably about 20 g/g to about 30 g/g. Particularly, in the case of absorbency under pressure, compared to the case wherein the modified nanoclay of the present invention is not used, the improvement effect of absorbency under pressure of about 40% or more, for example, about 40 to about 80%, or about 40 to about 60% may be exhibited.

The present invention will be explained in more detail in the following Examples. However, these examples are only to illustrate the present invention, and the scope of the invention is not limited thereto.

Example

Preparation of Modified Nanoclay and Monomer Composition

Preparation Example 1

1-1 Preparation of Modified Nanoclay 980 of distilled water was introduced into 20 g of laponite (nanoclay having a particle diameter of 25 nm, a particle height of 1 nm and a specific surface area of 370 m²/g), followed by dispersion using a stirrer for 2 hours, and then, introduction of 100 g of IPA (isopropyl alcohol), 0.1 g of a modifier MPTMS (3-methacryloxypropyltrimethoxysilane), and then 500 g of 1 mm bead ($ZrO_2$), and stirring for 24 hours to progress modification, and the final TSC was 2.1%.

After the modification, the reaction product was washed with acetone to obtain laponite powder. The modified amount was calculated by measuring the TGA loss by the following Equation 1.

$$T(TGA\ Loss\ \%) = A \times \frac{C}{(100 + B \times C)} \times 100\% \quad \text{[Equation 1]}$$

A: weight ratio thermally decomposed in the modifier
B: weight ratio remaining after the sol-gel reaction of the modifier and nanoclay
C: weight (g) of the modifier participating in the modification per 100 g of nanoclay 1-2 Preparation of a Monomer Composition Into 15 g of acrylic acid, 6.83 g of caustic soda (NaOH) and 20.24 g of water were introduced to neutralize to 82%, and then, into the neutralized solution, based on the weight of acrylic acid, 0.14 wt % of an initiator APS (Ammonium persulfate) and 0.18 wt % of SMBS (sodium metabisulfite) were introduced, and 8.1 wt % of the modified nanoclay prepared in the Preparation Example 1 was introduced to prepare a monomer composition.

Preparation Example 2

Modified nanoclay was prepared by the same method as Preparation Example 1-1, and a monomer composition comprising the same was prepared by the same method as Preparation Example 1-2, except that 0.3 g of MPTMS was introduced to progress modification when preparing modified nanoclay.

Preparation Example 3

Modified nanoclay was prepared by the same method as Preparation Example 1-1, and a monomer composition comprising the same was prepared by the same method as Preparation Example 1-2, except that 1.0 g of MPTMS was introduced to progress modification when preparing modified nanoclay.

Comparative Preparation Example 1

A monomer composition was prepared by the same method as Preparation Example 1-2, except that laponite (nanoclay having a particle diameter of 25 nm, a particle height of 1 nm, and a specific surface area of 370 m²/g), which is non-modified nanoclay, was used.

For the above Preparation Examples and Comparative Preparation Example, light transmittance, precipitation speed and modification amount were measured by the following assessment methods.

Experimental Example 1: Confirmation of Light Transmittance

For the monomer compositions (2 mm thickness) of Preparation Examples 1 to 3 and Comparative Preparation Example 1, transmittance to light of 470 nm wavelength was measured.

TABLE 1

|  | Light transmittance(%) |
| --- | --- |
| Preparation Example 1 | 90 |
| Preparation Example 2 | 90 |
| Preparation Example 3 | 50 |
| Comparative Preparation Example 1 | 40 |

Experimental Example 2: Confirmation of Precipitation Speed

For the monomer compositions of Preparation Examples 1 to 3 and Comparative Preparation Example 1, transmittance to light of 470 nm was analyzed at 1,000 rpm through Lumisizer to measure the precipitation speed of the nanoclay.

TABLE 2

|  | Precipitation speed($\mu$m/s) |
| --- | --- |
| Preparation Example 1 | 0 |
| Preparation Example 2 | 0 |
| Preparation Example 3 | 2.21 |
| Comparative Preparation Example 1 | 5.52 |

Experimental Example 3: Confirmation of Modification Amount Using TGA

For the nanoclay of Preparation Examples 1 to 3 and Comparative Preparation Example 1, weight loss at the section of 200~800° C. was measured by TGA (Thermogravimetric analysis) to confirm TGA loss and modification amount according to the above Equations 1 to 4.

TABLE 3

|  | TGA Loss (%) | Modification amount($\mu$mol/m$^2$) |
| --- | --- | --- |
| Preparation Example 1 | 0.20 | 0.31 |
| Preparation Example 2 | 0.63 | 0.96 |
| Preparation Example 3 | 2.2 | 3.37 |
| Comparative Preparation Example 1 | 0 | 0 |

As shown in the Tables 1 and 2, the monomer compositions comprising modified nanoclay of Preparation Examples 1 to 3 have superior light transmittance and precipitation speed to the monomer compositions comprising non-modified nanoclay of Comparative Preparation Example 1, which is derived from the difference in the modification amount of (meth)acrylate groups to nanoclay as shown in Table 3.

Preparation of Superabsorbent Polymer

Example 1

100 g of acrylic acid, 121.5 g of 32% caustic soda (NaOH), 0.2 g of sodium persulfate as a thermal polymerization initiator, 0.008 g of diphenyl(2,4,6-trimethylbenzoyl)-phosphine oxide) as a photopolymerization initiator, 0.23 g of polyethyleneglycol diacrylate (PEGDA, product name: Miramer 280, available from Miwon Chemical, weight average molecular weight: 400 g/mol) and 36.6 g of water were mixed to prepare a monomer composition having an acrylic acid concentration of 46 wt %, and to the monomer composition, the modified nanoclay powder obtained in Preparation Example 1-1 was added in the form of an aqueous solution such that the weight of the modified nanoclay became 0.1 wt %, based on the weight of acrylic acid.

The monomer composition was fed on a rotary belt having a width of 10 cm and a length of 2m, and rotating at a speed of 50 cm/min, at a feeding speed of 500 mL/min to 2,000 mL/min.

Simultaneously with the feeding of the monomer composition, UV with an intensity of 10 mW/cm$^2$ was irradiated to progress a polymerization reaction for 60 seconds. After progressing the polymerization reaction, the product was cut with a meat chopper, and dried at 160° C. for 5 hours using a convection oven.

Example 2

Superabsorbent polymer was prepared by the same method as Example 1, except that polyethyleneglycol diacrylate (PEGDA) was used in an amount of 0.26 g.

Example 3

Superabsorbent polymer was prepared by the same method as Example 1, except that polyethyleneglycol diacrylate (PEGDA) was used in an amount of 0.3 g.

Comparative Example 1

The polymerization of superabsorbent polymer was progressed by the same method as Example 1, except that the modified nanoclay powder of Preparation Example 1 was not used.

Experimental Examples

Measurement of Centrifuge Retention Capacity (CRC) and Absorbency Under Pressure (AUP)

The centrifuge retention capacity was measured according to EDANA method WSP 241.2.

More specifically, the centrifuge retention capacity can be calculated by the following Formula 1, after absorbing superabsorbent polymer into a saline solution for 30 minutes.

$$CRC(g/g) = \{[W2(g) - W1(g)]/W0(g)\} - 1 \quad \text{[Formula 1]}$$

In the Formula 1,

W0(g) is the initial weight (g) of superabsorbent polymer, W1(g) is the weight of an equipment measured after dehydrating for 3 minutes at 250G using a centrifuge, without using superabsorbent polymer, and W2(g) is the weight of an equipment including superabsorbent polymer, measured after immersing superabsorbent polymer in a saline solution of 0.9 wt % at room temperature for 30 minutes to absorb it, and then, dehydrating for 3 minutes at 250G using a centrifuge.

And, the absorbency under pressure (AUP) of 0.7 psi can be measured according to EDANA method WSP 242.2. More specifically, the absorbency under pressure can be calculated according to the following Formula 2, after absorbing superabsorbent polymer in a saline solution under pressure of about 0.7 psi for 1 hour.

AUP(g/g)=[$W4(g)$-$W3(g)$]/$W0(g)$     [Formula 2]

In the Formula 2,
$W0(g)$ is the initial weight (g) of superabsorbent polymer, $W3(g)$ is the sum of the weight of an equipment capable of providing a load to the superabsorbent polymer, $W4(g)$ is the sum of the weight of the superabsorbent polymer and the weight of an equipment capable of providing a load to the superabsorbent polymer, after absorbing the superabsorbent polymer in a saline solution under a load (0.7 psi) for 1 hour.

The $W0(g)$'s in the Formulae 1 to 2 correspond to the initial weight (g) before absorbing the superabsorbent polymer in a saline solution, and may be identical to or different from each other. 20 g of the superabsorbent polymer samples of Examples 1 to 3 and Comparative Example 1, classified to 30 to 50 meshes, were put in a tea bag and soaked in a 0.9% saline solution for 30 minutes, and then, water was removed for 3 minutes in a centrifuge set to 250G, and the weights of the samples were measured to measure the amount of water held in the superabsorbent polymer, thus measuring centrifuge retention capacity.

The centrifuge retention capacity and the absorbency under pressure of Examples 1 to 3 and Comparative Example 1, measured according to the above measurement methods, are described in the following Table 4.

TABLE 4

| | Centrifuge retention capacity(g/g) | Absorbency under pressure(g/g) |
|---|---|---|
| Example 1 | 37.2 | 25.0 |
| Example 2 | 37.7 | 23.0 |
| Example 3 | 38.2 | 21.7 |
| Comparative Example 1 | 37.0 | 15.0 |

As shown in Table 4, in the case of case Example 1 to 3 wherein superabsorbent polymer is prepared using nanoclay modified with (meth)acrylate functional groups and alkyleneglycol multifunctional (meth)acrylate as internal crosslinking agents, absorbency under pressure increased at least 44% and maximally about 66%, compared to Comparative Example 1.

What is claimed is:

1. A superabsorbent polymer comprising a crosslinked polymer of water soluble ethylenically unsaturated monomers having acid groups of which at least a part are neutralized, wherein the crosslinked polymer comprises:
   a dual crosslink structure derived from (1) a modified nanoclay comprising (meth)acrylate functional groups chemically bonded on a basal surface or an edge of a nanoclay; and (2) an alkyleneglycol multifunctional (meth)acrylate,
   wherein, in the modified nanoclay, the (meth)acrylate function groups are chemically bonded at the ratio of 0.21 to 2.0 μmol/m² based on the surface area of the nanoclay.

2. The superabsorbent polymer according to claim 1, wherein the nanoclay is one or more selected from the group consisting of montmorillonite, saponite, nontronite, laponite, beidelite, hectorite, vermiculite, magadiite, kaolin, serpentine, and mica.

3. The superabsorbent polymer according to claim 1, wherein 2 to 200 (meth)acrylate functional groups are chemically bonded per one nanoclay particle for modification.

4. The superabsorbent polymer according to claim 1, wherein the nanoclay has a diameter of 10 to 500 nm.

5. The superabsorbent polymer according to claim 1, wherein the alkyleneglycol multifunctional (meth)acrylate includes one or more selected from the group consisting of polyethyleneglycol diacrylate, glycerin diacrylate, glycerin triacrylate, non-modified or ethoxylated trimethylol triacrylate, hexanediol diacrylate, and triethyleneglycol diacrylate.

6. The superabsorbent polymer according to claim 1, wherein centrifuge retention capacity (CRC) of the superabsorbent polymer measured according to EDANA method WSP 241.2 is 30 to 45 g/g.

7. The superabsorbent polymer according to claim 1, wherein absorbency under pressure (AUP) of the superabsorbent polymer measured according to EDANA method WSP 242.2 is 20 to 35 g/g.

8. A method for preparing superabsorbent polymer comprising:
   preparing a monomer composition comprising water soluble ethylenically unsaturated monomers; a polymerization initiator; a modified nanoclay comprising (meth)acrylate functional groups chemically bonded on a basal surface or an edge of a nanoclay; and an alkyleneglycol multifunctional (meth)acrylate; and
   progressing thermal polymerization or photopolymerization of the monomer composition to form hydrogel polymer,
   wherein the modified nanoclay is modified by adding a modifier comprising (meth)acrylate groups to a nanoclay and reacting to form the modified nanoclay, and
   wherein the modifier comprising (meth)acrylate groups is added such that the modified nanoclay comprises (meth)acrylate groups at the ratio of 0.21 to 2.0 μmol/m², based on the surface area of the nanoclay.

9. The method according to claim 8, wherein the nanoclay is one or more selected from the group consisting of montmorillonite, saponite, nontronite, laponite, beidelite, hectorite, vermiculite, magadiite, kaolin, serpentine, and mica.

10. The method according to claim 8, wherein 2 to 200 (meth)acrylate functional groups are introduced per one nanoclay particle for modification.

11. The method according to claim 8, wherein the nanoclay has a diameter of 10 to 500 nm.

12. The method according to claim 8, wherein the modified nanoclay is included in an amount of 0.01 to 10 parts by weight, based on 100 parts by weight of the water soluble ethylenically unsaturated monomers.

13. The method according to claim 8, wherein the alkyleneglycol multifunctional (meth)acrylate is included in an amount of 0.001 to 2 parts by weight, based on 100 parts by weight of the water soluble ethylenically unsaturated monomers.

14. The method according to claim 8, wherein a weight ratio of the modified nanoclay to the alkyleneglycol multifunctional (meth)acrylate is 1:0.05 to 1:10.

15. The method according to claim 8, further comprising:
   drying, and milling the hydrogel polymer to form a base resin; and conducting a surface cross-linking reaction of the base resin, in the presence of a surface cross-linking agent.

* * * * *